(12) United States Patent
Raman et al.

(10) Patent No.: US 11,018,970 B2
(45) Date of Patent: May 25, 2021

(54) MONITORING RESOURCE CONSUMPTION FOR DISTRIBUTED SERVICES

(71) Applicant: Nicira, Inc., Palo Alto, CA (US)

(72) Inventors: Chidambareswaran Raman, Sunnyvale, CA (US); Subrahmanyam Manuguri, San Jose, CA (US); Raju Koganty, San Jose, CA (US); Anirban Sengupta, Saratoga, CA (US)

(73) Assignee: NICIRA, INC., Palo Alto, CA (US)

( * ) Notice: Subject to any disclaimer, the term of this patent is extended or adjusted under 35 U.S.C. 154(b) by 405 days.

(21) Appl. No.: 15/366,793

(22) Filed: Dec. 1, 2016

(65) Prior Publication Data

US 2018/0123939 A1 May 3, 2018

Related U.S. Application Data

(60) Provisional application No. 62/415,458, filed on Oct. 31, 2016.

(51) Int. Cl.
| | |
|---|---|
| *H04L 12/24* | (2006.01) |
| *H04L 12/26* | (2006.01) |
| *H04L 12/911* | (2013.01) |

(52) U.S. Cl.
CPC .......... *H04L 43/16* (2013.01); *H04L 41/5016* (2013.01); *H04L 43/045* (2013.01); *H04L 43/0811* (2013.01); *H04L 43/0876* (2013.01); *H04L 43/50* (2013.01); *H04L 47/745* (2013.01); *H04L 47/822* (2013.01); *H04L 47/828* (2013.01); *H04L 41/0893* (2013.01)

(58) Field of Classification Search
CPC ... H04L 43/16; H04L 41/5016; H04L 43/045; H04L 43/0811; H04L 43/0876; H04L 43/50; H04L 47/745; H04L 47/822; H04L 47/828; H04L 41/0893
See application file for complete search history.

(56) References Cited

U.S. PATENT DOCUMENTS

| | | | |
|---|---|---|---|
| 8,605,655 | B1 | 12/2013 | Sahai et al. |
| 9,215,213 | B2 | 12/2015 | Bansal et al. |
| 9,438,560 | B2 | 9/2016 | Mohanty et al. |
| 9,438,634 | B1 | 9/2016 | Ross et al. |
| 9,467,476 | B1 | 10/2016 | Shieh et al. |
| 9,787,641 | B2 | 10/2017 | Bansal et al. |
| 10,298,619 | B2 | 5/2019 | Nimmagadda et al. |
| 10,419,321 | B2 | 9/2019 | Raman et al. |

(Continued)

OTHER PUBLICATIONS

El-Atawy, Adel, et al., "Policy Segmentation for Intelligent Firewall Testing," 1st IEEE ICNP Workshop on Secure Network Protocols, Nov. 6, 2005, 6 pages, IEEE, Boston, MA, USA.

(Continued)

*Primary Examiner* — Philip J Chea
*Assistant Examiner* — Hassan A Khan
(74) *Attorney, Agent, or Firm* — Adeli LLP

(57) ABSTRACT

A method for monitoring several data compute nodes (DCNs) on a group of managed host machines is provided. The method receives service usage data from a group of managed hosts. The service usage data identifies service usage for each of a plurality of entities associated with each managed host. The method aggregates the received service usage data. The method displays the aggregated service usage data.

22 Claims, 9 Drawing Sheets

(56) References Cited

U.S. PATENT DOCUMENTS

| | | |
|---|---|---|
| 10,567,440 B2 | 2/2020 | Bansal et al. |
| 10,608,993 B2 | 3/2020 | Bansal et al. |
| 2003/0120955 A1 | 6/2003 | Bartal et al. |
| 2005/0262554 A1 | 11/2005 | Brooks et al. |
| 2007/0011734 A1 | 1/2007 | Balakrishnan et al. |
| 2008/0037423 A1 | 2/2008 | Singh et al. |
| 2008/0059596 A1 | 3/2008 | Ogawa |
| 2008/0196102 A1 | 8/2008 | Roesch |
| 2008/0267186 A1 | 10/2008 | Boukis et al. |
| 2008/0282335 A1 | 11/2008 | Abzarian et al. |
| 2009/0300341 A1 | 12/2009 | Buehler et al. |
| 2010/0106764 A1 | 4/2010 | Chadwick et al. |
| 2010/0107085 A1 | 4/2010 | Chadwick et al. |
| 2010/0293544 A1* | 11/2010 | Wilson ................ G06F 9/45558 718/1 |
| 2010/0325199 A1* | 12/2010 | Park ........................ G06F 16/10 709/203 |
| 2010/0332262 A1* | 12/2010 | Horvitz .................. G06Q 30/06 705/4 |
| 2012/0131591 A1* | 5/2012 | Moorthi ................... H04L 67/10 718/104 |
| 2012/0226808 A1* | 9/2012 | Morgan .................. G06Q 30/04 709/226 |
| 2013/0067090 A1* | 3/2013 | Batrouni ............. H04L 67/1097 709/226 |
| 2013/0185413 A1* | 7/2013 | Beaty .................. H04L 43/0876 709/224 |
| 2015/0135003 A1 | 5/2015 | Cota-Robles et al. |
| 2015/0236935 A1 | 8/2015 | Bassett |
| 2015/0358288 A1 | 12/2015 | Jain et al. |
| 2015/0358391 A1 | 12/2015 | Moon et al. |
| 2016/0112443 A1 | 4/2016 | Grossman et al. |
| 2016/0156591 A1 | 6/2016 | Zhou et al. |
| 2016/0191463 A1 | 6/2016 | Mohanty et al. |
| 2016/0294987 A1 | 10/2016 | Tian et al. |
| 2016/0323318 A1 | 11/2016 | Terrill et al. |
| 2016/0350683 A1 | 12/2016 | Bester et al. |
| 2017/0005986 A1 | 1/2017 | Bansal et al. |
| 2017/0019487 A1 | 1/2017 | Maheshwari et al. |
| 2017/0078168 A1 | 3/2017 | Harris et al. |
| 2017/0207968 A1 | 7/2017 | Eicken et al. |
| 2017/0222977 A1 | 8/2017 | Newell et al. |
| 2017/0293994 A1 | 10/2017 | Li et al. |
| 2017/0324632 A1 | 11/2017 | Arora |
| 2017/0324765 A1 | 11/2017 | McLaughlin et al. |
| 2017/0359217 A1 | 12/2017 | Ahuja et al. |
| 2017/0374102 A1 | 12/2017 | Woolward |
| 2017/0374106 A1 | 12/2017 | Hamou et al. |
| 2018/0007127 A1* | 1/2018 | Salapura ................ G06F 21/105 |
| 2018/0027080 A1 | 1/2018 | Yang et al. |
| 2018/0032399 A1 | 2/2018 | Johnson et al. |
| 2018/0034856 A1 | 2/2018 | Mallya |
| 2018/0041578 A1 | 2/2018 | Lee et al. |
| 2018/0048623 A1 | 2/2018 | Bansal et al. |
| 2018/0077119 A1 | 3/2018 | Fields et al. |
| 2018/0077189 A1 | 3/2018 | Doppke et al. |
| 2018/0084034 A1* | 3/2018 | Stelmar Netto .......... G06F 9/46 |
| 2018/0088964 A1* | 3/2018 | Hussain ................ G06F 9/4405 |
| 2018/0101371 A1 | 4/2018 | Flanakin et al. |
| 2018/0123907 A1 | 5/2018 | Raman et al. |
| 2018/0145999 A1 | 5/2018 | Ertugrul et al. |
| 2018/0167405 A1 | 6/2018 | Comay et al. |
| 2018/0176102 A1 | 6/2018 | Bansal et al. |
| 2018/0176252 A1 | 6/2018 | Nimmagadda et al. |
| 2018/0176261 A1 | 6/2018 | Bansal et al. |
| 2019/0180141 A1 | 6/2019 | Tiagi et al. |
| 2019/0182276 A1 | 6/2019 | Tiagi et al. |
| 2019/0230064 A1 | 7/2019 | Soman |

OTHER PUBLICATIONS

Anwar, Mahwish, "Virtual Firewalling for Migrating Virtual Machines in Cloud Computing," 2013 5th International Conference on Information and Communication Technologies, Dec. 14-15, 2013, 11 pages, IEEE, Karachi, Pakistan.

Blei, David M., "Probabilistic Topic Models," Communications of the ACM, Apr. 2012, 8 pages, vol. 55, No. 4, ACM, New York, New York, USA.

Maheshwari, Ritu, et al., "Private Virtual Cloud Infrastructure Modelling using 'VCPHCF-RTT' Security Agent," 2018 4th International Conference on Computing Communication and Automation (ICCCA), Dec. 14-15, 2018, 5 pages, IEEE, Greater Noida, India.

Mimno, David, et al., "Bayesian Checking for Topic Models," Proceedings of the Conference on Empirical Methods in Natural Language Processing, Jul. 27-31, 2011, 11 pages, ACL, Edinburgh, Scotland, UK.

Steyvers, Mark, et al., "Probabilistic Topic Models," Handbook of Latent Semantic Analysis, Month Unknown 2007, 15 pages, Laurence Erlbaum Associates.

Ghafir, Ibrahim, et al., "A Survey on Network Security Monitoring Systems," 2016 IEEE 4th International Conference on Future Internet of Things and Cloud Workshops, Aug. 22-24, 2016, 6 pages, IEEE, Vienna, Austria.

* cited by examiner

MONITORING RESOURCE CONSUMPTION FOR DISTRIBUTED SERVICES

CLAIM OF BENEFIT TO PRIOR APPLICATIONS

This application claims the benefit of U.S. Provisional Patent Application 62/415,458, filed Oct. 31, 2016. U.S. Provisional Patent Application 62/415,458 is incorporated herein by reference.

BACKGROUND

In various multi-tenant environments (e.g., cloud environments, datacenters, etc.), several host machines operate to host virtual machines (VMs) for the different tenants of the multi-tenant environment. In some cases, several workload (or guest) VMs of various different tenants can operate on a single host, maintaining a logical separation so that traffic for the workload VMs of the different tenants is isolated from each other.

Increasingly, in such shared environments, security services (as well as other services) must be applied within the datacenter, not only against external threats, but as well as from threats of other machines within the datacenter. In some such cases, the services are distributed and enforced throughout the network. For example, a distributed firewall provides firewall services with multiple enforcement points throughout the network (e.g., at hypervisors that operates on each host machine).

However, distributing the services comes with a cost, as the services consume resources in the host to be used by the VMs. This is an important factor to consider when deciding the number of workload VMs that can be effectively run on the host. There is no way for the administrator to identify how much resources are being consumed by different distributed services (e.g., firewall, load balancing, anti-virus, etc.). As the services are distributed throughout the network, they must also be scaled as new host machines (for new workload machines) are added to the network.

While resources for the workload VMs are often managed by virtualization layers that operate on the hosts, services provided for the workload VMs by each host are not similarly managed. It is often possible for network traffic from certain VMs to use a majority of the service resources (e.g., processing and memory resources dedicated to providing the services), starving the other VMs that share the service resources on the host. For example, VMs for a particular tenant could create a huge number of connections that fill up a heap for a distributed firewall (DFW), monopolizing the service resources and preventing VMs of other tenants from creating new connections. Similar problems can also arise between different services, different providers of the services, etc.

BRIEF SUMMARY

Some embodiments provide a method for managing service resources of a plurality of host machines. Service resources, as described in this application, include resources (e.g., processor, memory, etc.) that are reserved for services (e.g., security, load balancing, encryption, etc.) provided for guest virtual machines (VMs) that operate on a particular host machine. The services of some embodiments include firewall, dynamic host configuration protocol (DHCP), handling of address resolution protocol (ARP) requests, etc. In some embodiments, the services of a host machine also include third party services (e.g., anti-virus, etc.) that operate as security VMs on the host machine.

The method of some embodiments receives a service distribution configuration for several entities. The service distribution configuration of some embodiments includes configuration data for allocating service resources between the different entities operating on the host machine. In some embodiments, allocating the service resources between the different entities includes distributing the service resource between different tenants, different services (e.g., firewall, load balancing, encryption, third party security, etc.), or even at the VM (or virtual network interface controller (VNIC)) level. In some embodiments, the service resources are allocated between different providers of services, where a single provider may provide more than one service. In some embodiments, the service resources are allocated between a set of host services and a set of third party services from different providers.

In some embodiments, the method is performed by a services manager, which manages a group of host machines. The services manager then identifies a set of host machines on which a set of VMs for the different entities operate, and determines an amount of resources to be assigned to each entity of the plurality of entities. In some embodiments, the method proportionally determines the amount of resources to be assigned to the different entities based on a number of VMs for each entity operating on the host machine. Alternatively, or conjunctively, the method of some embodiments determines the amount of resources to be assigned to the different entities based on properties of the services (e.g., a number of rules stored for each entity). The method of some embodiments determines the amount of resources to assign to different entities based on a weight value assigned to each entity. The weight value of some embodiments is used to adjust the proportion of service resources that are made available for use by the services of the different entities. In some embodiments, the method assigns a minimum amount of resources (or a minimum level of service) for preferred entities (e.g., tenants that pay for higher levels of service), and distributes the remaining resources for use by the remaining entities.

The method then communicates with the identified set of host machines to modify a set of resource pools available on each host machine. The resource pools of some embodiments control the allocation and availability of host resources for the different services. For example, in some embodiments, the host resources include processing resources and memory resources of the host machine, which have been allocated for the services.

Some embodiments provide a method for monitoring service usage by virtual machines on host machines. Each virtual machine of some embodiments is associated with one of several entities. The method of some embodiments receives service usage data from the managed host machines. Service resources, as described in this application, include resources (e.g., processor, memory, etc.) that are reserved for services provided for guest virtual machines (VMs) that operate on a particular host machine. The service usage data of some embodiments includes usage measurements for host resources (e.g., processor, memory, etc.) and/or a connections per second (CPS) measurement, which measures a rate at which connections are handled or created by a service (e.g., a distributed firewall) for an entity.

The service usage data identifies service usage for VMs associated with each entity. The method then aggregates the received service usage data and provides the aggregated service usage data to a user (e.g., an administrator for a datacenter/cloud environment/tenant/etc.). The method of some embodiments displays the aggregated service usage data as a part of a user interface for a management application. The displayed aggregated service data can then be used to troubleshoot potential problems in the network or to calculate charges for different tenants of the network based on the service usage data.

Alternatively, or conjunctively, the method of some embodiments uses the aggregated service usage data to provide alerts to the user when the service usage exceeds particular thresholds. The thresholds of some embodiments are identified by an administrator of a network (e.g., a datacenter, a logical network within a datacenter, etc.) at a services manager, which sets the thresholds for the services at the various hosts. Some embodiments provide a method for monitoring several virtual machines operating on a host machine. The method monitors a service usage metric that measures usage of service resources by the plurality of VMs. In some embodiments, the method calculates the service usage metric periodically (e.g., once every 30 seconds) and/or upon receiving input (e.g., from an administrator) to calculate the service usage metric.

When the service usage metric exceeds a particular threshold value a particular number of times, the method generates an alert to notify a user of a potential unavailability of available service resources. In some embodiments, the method generates different types of alerts based on different threshold values or when the service usage metric continues to exceed the particular threshold value for a greater number of times. In some embodiments, the method, in addition to generating the alert, acts to automatically alleviate the situation by modifying the allocation of host resources, redistributing VMs to different host machines, etc.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
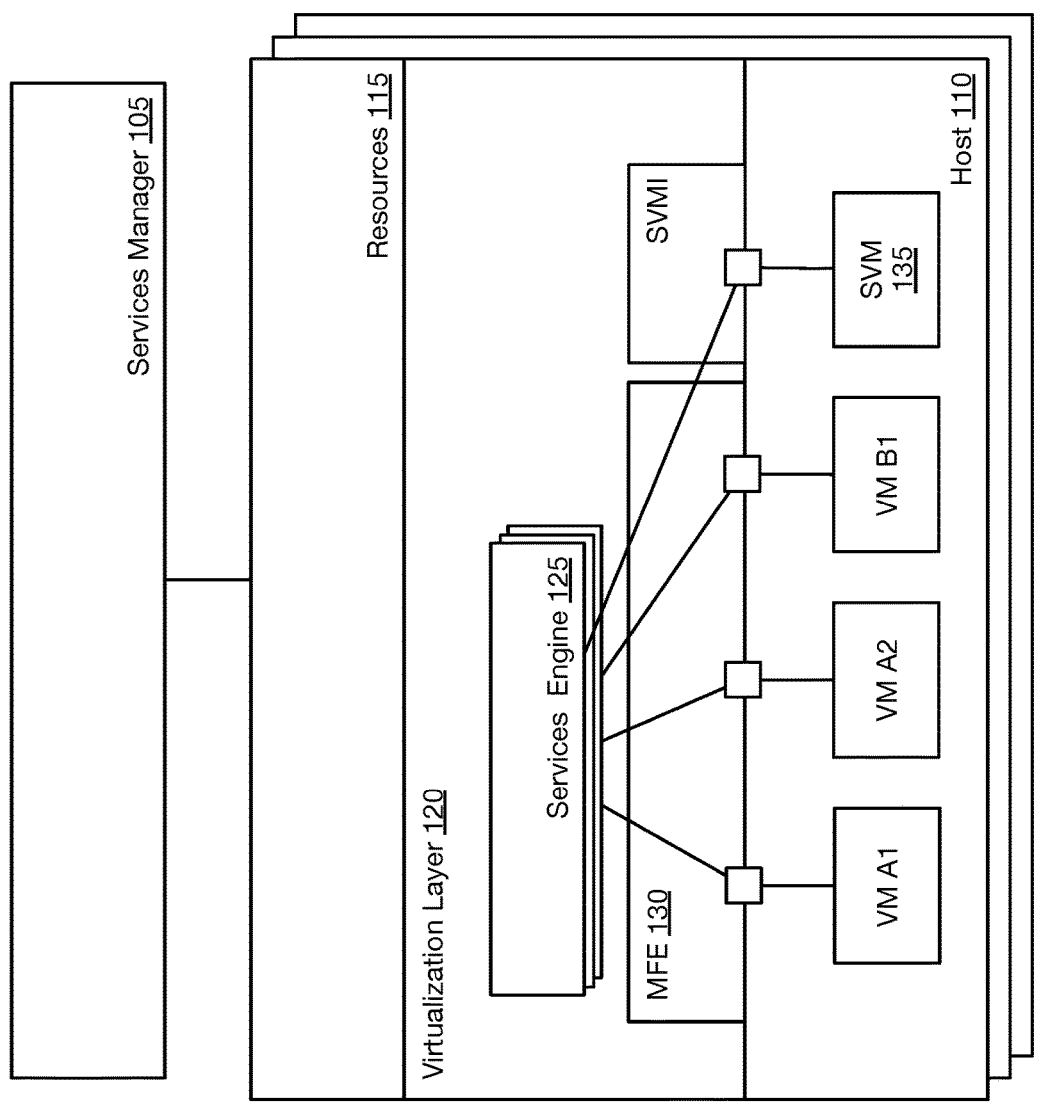
FIG. 1 illustrates an example of a system for managing resources for services at host machines in a network.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a method for managing service resources of a plurality of host machines. Service resources, as described in this application, include resources (e.g., processor, memory, etc.) that are reserved for services (e.g., security, load balancing, encryption, etc.) provided for guest virtual machines (VMs) that operate on a particular host machine. The services of some embodiments include firewall, dynamic host configuration protocol (DHCP), handling of address resolution protocol (ARP) requests, etc. In some embodiments, the services of a host machine also include third party services (e.g., anti-virus, etc.) that operate as security VMs on the host machine.

The method of some embodiments receives a service distribution configuration for several entities. The service distribution configuration of some embodiments includes configuration data for allocating service resources between the different entities operating on the host machine. In some embodiments, allocating the service resources between the different entities includes distributing the service resource between different tenants, different services (e.g., firewall, third party security, etc.), or even at the VM (or virtual network interface controller (VNIC)) level. In some embodiments, the service resources are allocated between different providers of services, where a single provider may provide more than one service. In some embodiments, the service resources are allocated between a set of host services and a set of third party services from different providers.

In some embodiments, the method is performed by a services manager, which manages a group of host machines. The services manager then identifies a set of host machines on which a set of VMs for the different entities operate, and determines an amount of resources to be assigned to each entity of the plurality of entities. In some embodiments, the method proportionally determines the amount of resources to be assigned to the different entities based on a number of VMs for each entity operating on the host machine. Alternatively, or conjunctively, the method of some embodiments determines the amount of resources to be assigned to the different entities based on properties of the services (e.g., a number of rules stored for each entity). The method of some embodiments determines the amount of resources to assign to different entities based on a weight value assigned to each entity. The weight value of some embodiments is used to adjust the proportion of service resources that are made available for use by the different entities. In some embodiments, the method assigns a minimum amount of resources (or a minimum level of service) for preferred entities (e.g., tenants that pay for higher levels of service), and distributes the remaining resources for use by the remaining entities.

The method then communicates with the identified set of host machines to modify a set of resource pools available on each host machine. The resource pools of some embodiments control the allocation and availability of host resources for the different services. For example, in some embodiments, the host resources include processing resources and memory resources of the host machine, which have been allocated for the services.

Some embodiments provide a method for monitoring service usage by virtual machines on host machines. Each virtual machine of some embodiments is associated with one of several entities. The method of some embodiments receives service usage data from the managed host machines. Service resources, as described in this application, include resources (e.g., processor, memory, etc.) that are reserved for services provided for guest virtual machines (VMs) that operate on a particular host machine. The service usage data of some embodiments includes usage measurements for host resources (e.g., processor, memory, etc.) and/or a connections per second (CPS) measurement, which measures a rate at which connections are handled or created by a service (e.g., a distributed firewall) for an entity.

The service usage data identifies service usage for VMs associated with each entity. The method then aggregates the received service usage data and provides the aggregated service usage data to a user (e.g., an administrator for a datacenter/cloud environment/tenant/etc.). The method of some embodiments displays the aggregated service usage data as a part of a user interface for a management application. The displayed aggregated service data can then be used to troubleshoot potential problems in the network or to calculate charges for different tenants of the network based on the service usage data.

Alternatively, or conjunctively, the method of some embodiments uses the aggregated service usage data to provide alerts to the user when the service usage exceeds particular thresholds. The thresholds of some embodiments are identified by an administrator of a network (e.g., a datacenter, a logical network within a datacenter, etc.) at a services manager, which sets the thresholds for the services at the various hosts. Some embodiments provide a method for monitoring several virtual machines operating on a host machine. The method monitors a service usage metric that measures usage of service resources by the plurality of VMs. In some embodiments, the method calculates the service usage metric periodically (e.g., once every 30 seconds) and/or upon receiving input (e.g., from an administrator) to calculate the service usage metric.

When the service usage metric exceeds a particular threshold value a particular number of times, the method generates an alert to notify a user of a potential unavailability of available service resources. In some embodiments, the method generates different types of alerts based on different threshold values or when the service usage metric continues to exceed the particular threshold value for a greater number of times. In some embodiments, the method, in addition to generating the alert, acts to automatically alleviate the situation by modifying the allocation of host resources, redistributing VMs to different host machines, etc.

An overview of the process for managing and monitoring the resource usage of distributed services has been described above. Further details and examples are described below. Specifically, Section I describes a distributed service system for managing and monitoring the resource usage of distributed services. Section II describes examples for allocating service resources at hosts in a system. Section III then describes examples of monitoring service usage at the hosts in the system. Finally, section IV describes an electronic system with which some embodiments of the invention are implemented.

I. Distributed Services System

FIG. 1 illustrates an example of a distributed services system for managing resources for services (e.g., security, firewall, load balancing, etc.) at host machines in a network. The distributed services system 100 of some embodiments provides distributed services at many points in the system. The system 100 shows a services manager 105 that manages a series of host machines 110. In some embodiments, the services manager 105 operates on a set of controllers that manage virtualization layers and/or software forwarding elements of the host machines.

Each host machine 110 includes resources 115, which represent the central processing unit(s) (CPU), memory, etc. of the host machine 110. The host machine 110 also includes a virtualization layer 120, which virtualizes the resources 115 for use by the various workload VMs (A1, A2, and B1) operating on the host machine 110.

In some embodiments, the distributed services are provided by one or more service modules (or service engines) that operate within the virtualization software 120 (e.g., a hypervisor) of the host machine 110 to provide various services (e.g., load balancing, encryption, firewall, security, etc.) for workload machines on the host. Alternatively, or conjunctively, the distributed services of some embodiments are provided by security virtual machines (SVMs) (or security data compute nodes (SDCNs) that provide specialized services (e.g., firewall, anti-virus, etc.) for the workload VMs operating on the host machine. The SVMs of some embodiments are third-party VMs from third-party vendors (e.g., Palo Alto Networks, McAfee, Symantec, etc.) to provide the services. The SVMs are not directly connected to the workload VMs of the host machine 110, but rather through a SVM interface (SVMI) to provide secured services for the workload VMs.

In some embodiments, the host machines 110 use a combination of both system modules (e.g., service engine 125) and third-party SVMs (e.g., SVM 135) to provide services for the workload machines. In some embodiments, the service engine (SE) 125 intercepts network traffic to perform a service (e.g., firewall rule checks) based on locally stored information (e.g., firewall rules). In other embodiments, the SE 125 captures the network traffic, but communicates with an SVM 135 (e.g., a firewall SVM) that performs the service. In some embodiments, the SE 125 functions, not only as a system module for communicating with an SVM 135, but also as a service engine that performs its own set of services.

In some embodiments, the SE 125 intercepts (or filters) incoming and/or outgoing network traffic for each service of the workload VMs A1, A2, and B1. The packets of some embodiments are captured at a port of a software forwarding element (MFE 130) that operates on the host machine 110. The ports of the software forwarding element 130 in some embodiments include one or more function calls to one or more system modules that implement system operations (e.g., firewall, ARP broadcast suppression, DHCP broadcast suppression, etc.) on incoming and outgoing packets that are received at the ports.

Other security and I/O system operations can also be implemented in some embodiments of the invention. By implementing a stack of such function calls, the ports can implement a chain of operations on incoming and/or outgoing packets in some embodiments. Also, in some embodiments, other modules in the data path (such as the VNICs, etc.) implement the security and I/O function call operations (such as the firewall function calls), instead of the ports.

In some embodiments, when a service is applied to a group of workload VMs at a host machine 110, a service instance filter is created on each of the virtual network interface controllers (VNICs) associated with the workload VMs. The filter channels various network communications (e.g., network connection requests) to a service module and/or a SVM for inspection. In some embodiments, each filter is used to store the network connections for the various network services and have rules configured there.

For example, in some embodiments, the service engine is a firewall engine for implementing a distributed firewall. The firewall engine can be called for incoming or outgoing packets to check whether such packets should be delivered to a VM or sent from a VM. When the distributed firewall service is enforced at a host machine, a firewall filter is configured on each VNIC on the host machine (unless the VM is placed in an exclusion list). The firewall rules for the distributed firewall are configured to check the packets on a per filter basis.

To perform this check, the filter of some embodiments supplies a set of attributes of a filtered packet to the service engine. In some embodiments, the set of packet attributes are packet identifiers, such as traditional five tuple identifiers, which include the packet's source identifier, destination identifier, source port, destination port, and protocol (service). Before supplying these identifiers to the service engine, the filter extracts these identifiers from a packet that it receives.

In some embodiments, one or more of the packet attributes, or packet identifiers, are logical values that are defined for a logical network (e.g., can be IP addresses defined in a logical address space). In other embodiments, all of the identifier values are defined in the physical domains. In still other embodiments, some of the identifier values are defined in logical domain, while other identifier values are defined in the physical domain. A logical network, in some embodiments, defines how data is passed between machines of the logical network, which may differ from the actual physical domain to which the machines are connected.

The firewall engine stores the firewall rules that it enforces in a firewall rules data storage. To enforce these rules, the firewall engine tries to match the received packets attribute set with corresponding attribute sets that are stored for the firewall rules. In some embodiments, each firewall rule in the data storage is specified in terms of (1) the same set of packet identifiers (e.g., five-tuple identifiers) that the firewall engine receives from the port, and (2) an action that is typically specified as an "allow" to allow a packet through or a "deny" to drop the packet. An identifier in a firewall rule can be specified in terms of an individual value or a wildcard value in some embodiments. In other embodiments, the identifier can further be defined in terms of a set of individual values or an abstract container, such as a security group, a compute construct, a network construct, etc.

In order to provide these services at the host machines 110, various host system resources are required. As described above, the resources 115 represent the various computing and memory resources of the host machine 110. These resources 115 need to be used, not only by the workload VMs, but by the host services (e.g., SE 125 and SVM 135) at the host machine 110.

For example, when SE 125 is a distributed firewall engine, when network traffic is flowing in the host machine 110, the SE 125 uses memory resources (e.g., stack and heap memory) to store the firewall rules, as well as computing resources to classify packets, apply firewall rules, and make decisions on what to do with a particular packet flow. In some embodiments, SE 125 also stores state information for network connections managed by the firewall engine in order to provide stateful firewall services. In some embodiments, the network connection state information is stored in the heap memory by the stateful firewall engine in the virtualization layer.

The distributed services are designed to scale-out. As more hosts with more workload VMs are added to the network, the distributed services are able to scale accordingly, as each host machine is able to provide the requisite services. However, as more workload VMs (with VNICs) are added to the host machines, there will be more filter instances and hence potentially more of the resources will be utilized by the corresponding services. As more distributed services are provided at the host machines, the resources consumed by the services will become an important factor in determining the number of VMs that can be run on each host. Scaling the expansion of workload VMs and host machines is a very important problem in large scale cloud environments.

However, the expansion of workload VMs and host machines in a cloud with several different entities (e.g., tenants, service providers, etc.) can lead to situations in which one entity monopolizes the connections heap and starves machines for other entities from access to the services. This does not benefit the end to end packet delivery.

II. Allocating Resource Pools for Host Services

In order to prevent such resource starvation, some embodiments provide a way for the provider administrator to specify and allocate an amount of resources that can be consumed by the services for the workload VMs. This feature also helps in preventing denial of service attacks on the host machines. By allocating service resources at a more granular level, no one VM can overwhelm the resources of the service (e.g., by creating an excessive number of network connections) and deny the service to others. Even if an outside attacker manages to infect a machine within the datacenter and keeps targeting it, they will only be able to consume the resources for that particular tenant.

In some embodiments, the host resources are split into resource pools to partition the available CPU and memory resources. The host machines of some embodiments provide a separate resource pool for the workload VMs of each tenant operating on the host machine to ensure certain service levels for different tenants. In some embodiments, the host machine allocates a set of workload resource pools for workload VMs and a separate set of service resource pools for the various services (e.g., service engine module, SVMs, etc.). In some embodiments, the service resource pools are further divided into sub-pools based on different divisions or entities, such as tenants, services, service providers, etc. The allocation of resources into various resource pools is described below with reference to FIGS. 2-4.

Figure 2:
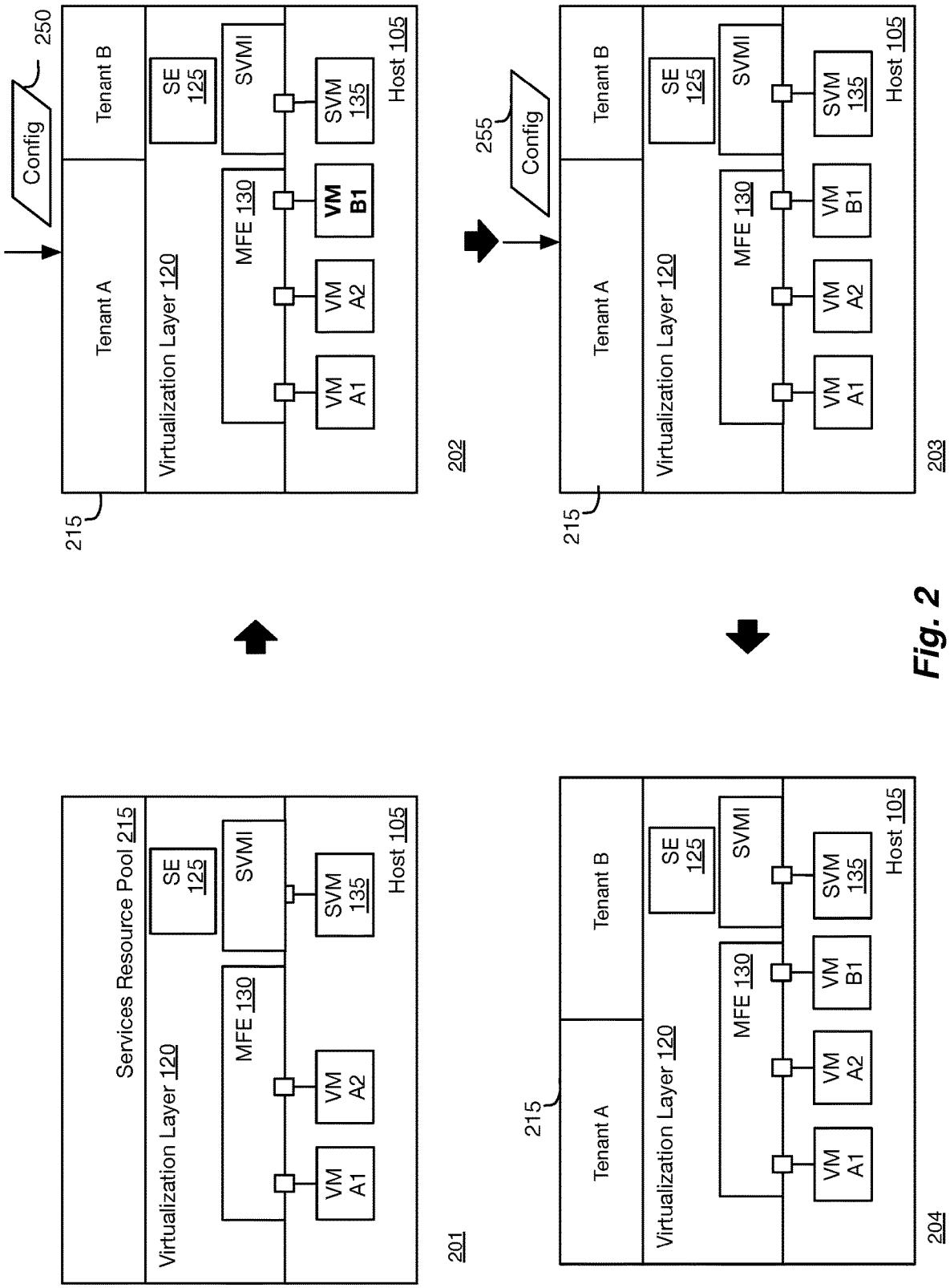
FIG. 2 illustrates an example of allocating resource pools for services at a host machine.

FIG. 2 illustrates an example of allocating resource pools for services at a host machine in four stages 201-204. Each stage shows a host 110 similar to those described above with reference to FIG. 1. In this example, the resources 215 represent the resources allocated to the services to be provided for the workload VMs of the host machine 110. For example, in some embodiments the services engine (SE) 125 is a firewall engine that uses the allocated resources of the service resource pool 215 to store network connection flows of the workload VMs to provide a stateful service.

The first stage 201 shows that VMs A1 and A2 for tenant A operate on host 105. Host 110 also includes a SVM 135 and SE 125 for providing other services for the workload VMs operating on host 110. In the first stage 201, the service resource pool 215 is shared between all of the host services (i.e., SE 125 and SVM 135).

Some embodiments of the invention provide a services manager (not shown) for managing the allocation of the service resource pools of the host machines in a network system. In some embodiments, the services manager provides a user interface (UI) and/or application programming interface (API) to configure and monitor the resource pools on a per entity basis. The allocation of some embodiments is configured as a percentage of the total available resource pool (i.e., from the pool of resources already allocated to the services) of the host machines.

The second stage 202 shows that host machine 110 receives a configuration 250 from a services manager. The configuration 250 is used to instantiate a new VM B1 for a new tenant B on host 105. The second stage 202 also shows that the service resource pool 215 of host 110 has been redistributed to accommodate services for machines (i.e., VM B1) of the new tenant B. In particular, resource pool 215 allocated for the services of host 105 has been divided between the tenants A and B.

The configuration 250 is used to assign some amount of the service resources for each tenant and for each service (e.g., based on the numbers of rules and number of VMs (2 MB for 10VMs, 100 k rules)). In some embodiments, the allocation of the host service resource pool 215 for the different tenants are automatically allocated based on one or more of a number of VMs to be instantiated, the types of VMs to be instantiated, service levels for the different tenants, etc.

In the third stage 203, host 110 receives another configuration 255 to adjust the allocation of the host service resource pool 215. The allocations may be adjusted for various reasons. For example, a new configuration may be received when the priorities for different tenants change, when a tenant requests additional service resources, in response to alerts triggered by potential resource shortages, etc.

In some embodiments, the configuration 255 also includes other configuration information that can be used to monitor the service usage at the host machine 110. For example, in some embodiments, the configuration 255 includes threshold information for a metric (e.g., an amount of free memory, consumed processor usage, etc.) of the consumed service resources. The host machine 110 of some such embodiments provides alerts and performs various actions based on various threshold values provided in the configuration 255. Alerts are described in further detail below in Section III.B.

The fourth stage 204 shows that the allocation of host service resource pool 215 has been modified to increase the resources available for the services of tenant B, based on the new configuration 255. In this example, the new allocation is not proportional to the number of VMs for each tenant, but rather is based on a service level required for workload VMs of tenant B. A cloud provider can make resources available for the various services to be used by the workload VMs for each tenant based on service level agreements (SLA) that a cloud provider has for different tenants.

Figure 3:
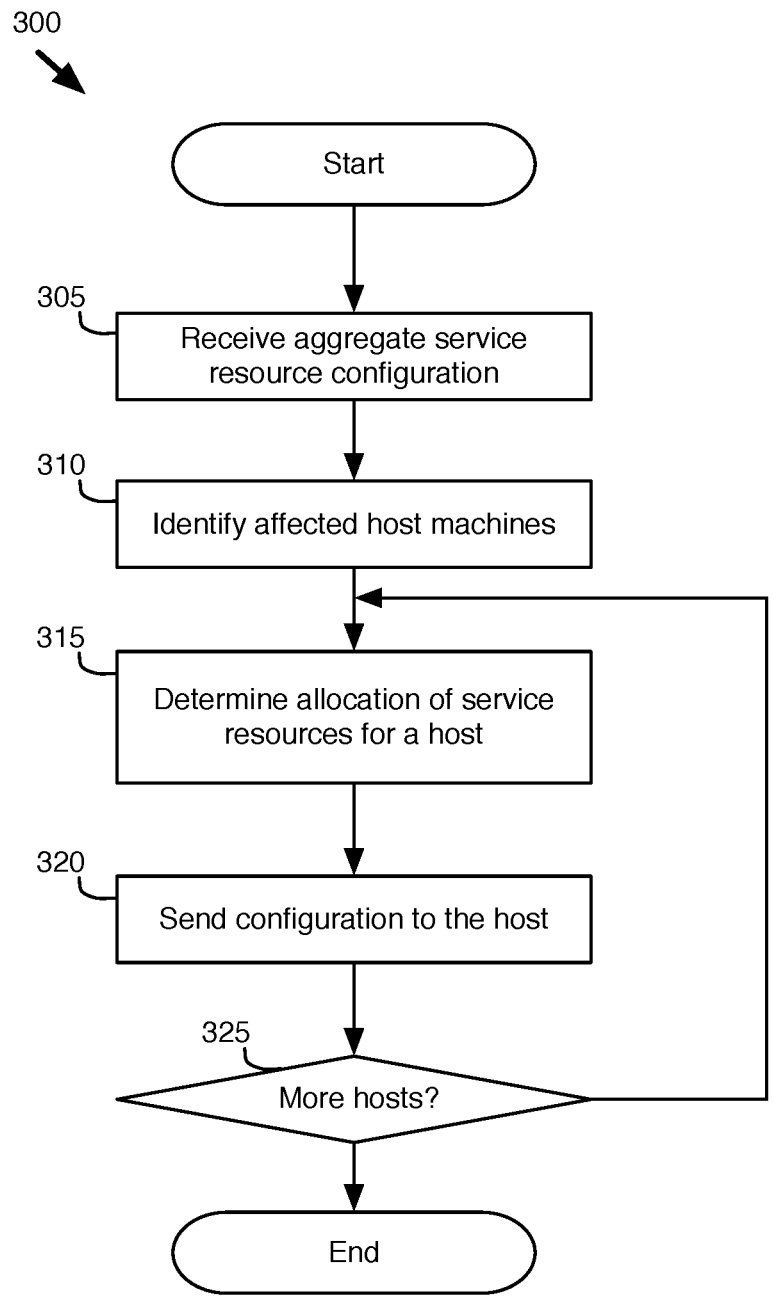
FIG. 3 conceptually illustrates a process for configuring service resources for hosts managed by a services manager.

FIG. 3 conceptually illustrates a process for configuring service resources for hosts managed by a services manager. The process 300 receives (at 305) an aggregate service resource configuration. In some embodiments, the aggregate service resource configuration determines a proportional distribution or priority for different tenants in the system. The aggregate service resource configuration of some embodiments identifies a minimum service level for certain tenants.

The process 300 then identifies (at 310) hosts that are affected by the aggregate service resource configuration. In some embodiments, the affected hosts are hosts at which the current resource allocation does not comply with requirements of the aggregate configuration. The process 300 then determines (at 315) a new allocation of service resources for one of the affected hosts.

The process 300 then sends (at 320) the new configuration to the affected host to redistribute the allocated resources for the host. In some embodiments, the process 300 sends (at 320) the new configuration through a set of API calls to a virtualization layer of the host machines, which uses the new configuration to generate and configure resource pools (or sub-resource pools) for the different tenants.

The process 300 determines (at 325) whether any additional hosts are affected by the aggregate service configuration received at 305. When the process 300 determines (at 325) that additional hosts are affected, the process 300 returns to step 310. Otherwise, the process 300 ends.

Figure 4:
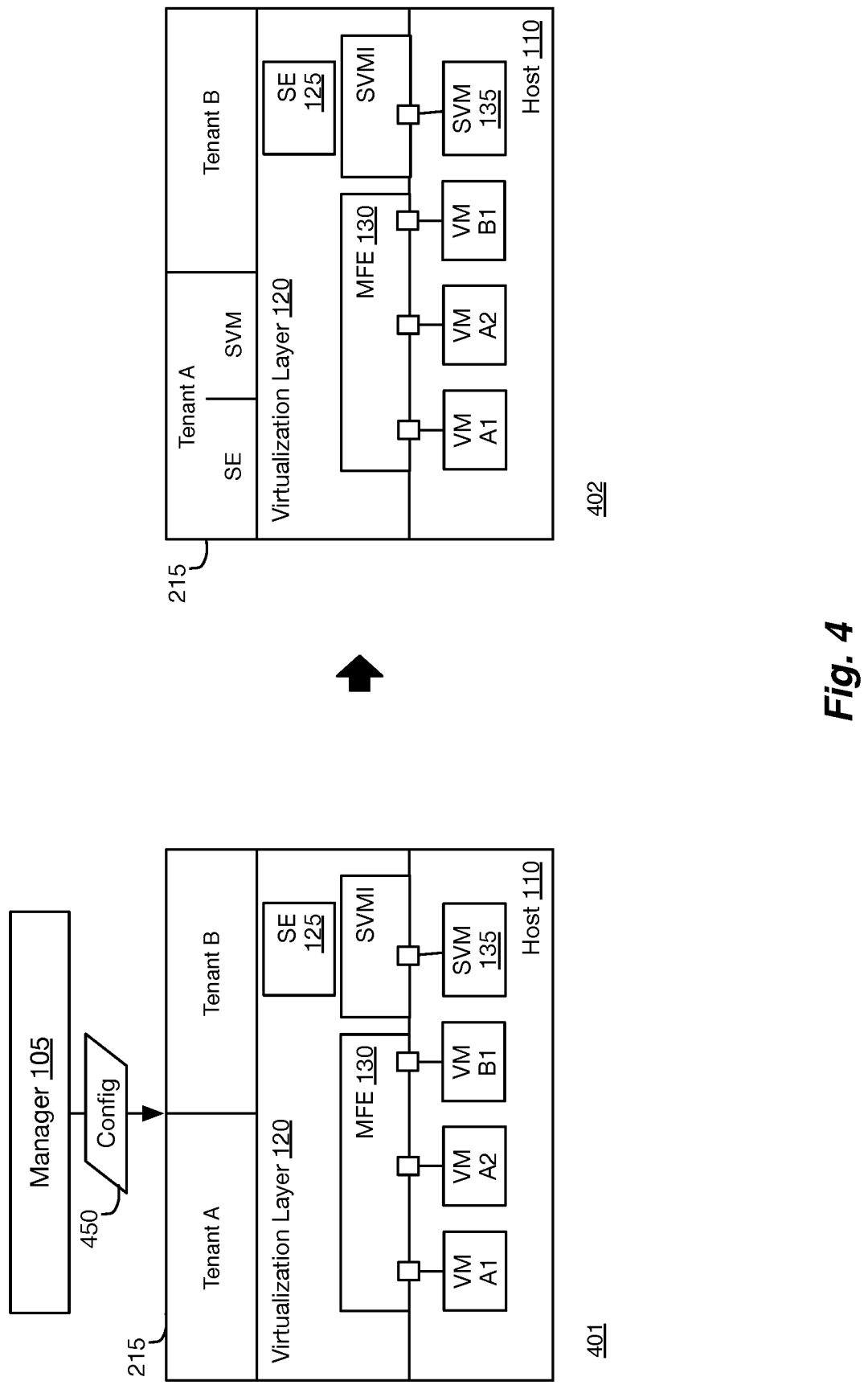
FIG. 4 illustrates an example of allocating resource sub-pools for granular resource assignments for services.

In the example of FIG. 2, the service resources are distributed between different tenants A and B. However, the services manager of some embodiments allocates the host's service resources based on other groups as well. FIG. 4 illustrates an example of allocating resource sub-pools for granular resource assignments for services in two stages 401-402. The first stage 401 shows host 105 as described in the example of FIG. 2. Host 105 provides SVM 135 and a services engine (SE) 125. The services engine may provide any of several different security and I/O services such as firewall, anti-virus, ARP suppression, etc.

In this example, in addition to dividing the host service resources between the different tenants, the resources for tenant A are further divided between the different services (i.e., services engine 125 and SVM 135), ensuring that one service does not starve the other service for resources. In this example, the network resources allocated for tenant B are not subdivided between the different network services. In some embodiments, the network resource allocations for network services can be different between the different tenants. In some embodiments, the allocations can be divided into multiple different levels. For example, in some embodiments, the SVM resources can be further divided between individual SVMs or into groups of SVM based on a provider (e.g., a third party developer), so that all of the SVMs developed by a particular provider share a single pool of resources.

Although many of the examples are described with a first level division of the security resources between different tenants, the allocation of service resources may not be based on tenants at all. For example, in some embodiments, service resources are allocated between the different services (or third-party (or partner) service providers that provide services) for any of the workload VMs operating on the host machine. This ensures that a particular service (or those of a particular partner) do not affect the provision of the other services for the workload VMs. In some embodiments, the services manager allocates the resources between the different partner SVMs and their service instances in the kernel of the host machines. The service resources can be allocated as a percentage of the total available service resource pool.

In some embodiments, the services manager allocates resource pools at a per VNIC level or per filter level as well.

When the host service resources are allocated at a per VNIC level, the service resources (e.g., the memory heap) are used for all of the services (e.g., firewall network connections, network connections for a partner service, etc.). When the host service resources are allocated at a filter level, the network connections for that particular filter (either host service or partner SVM service) is stored in the heap, providing granular control of the heap size required for each VNIC.

Figure 5:
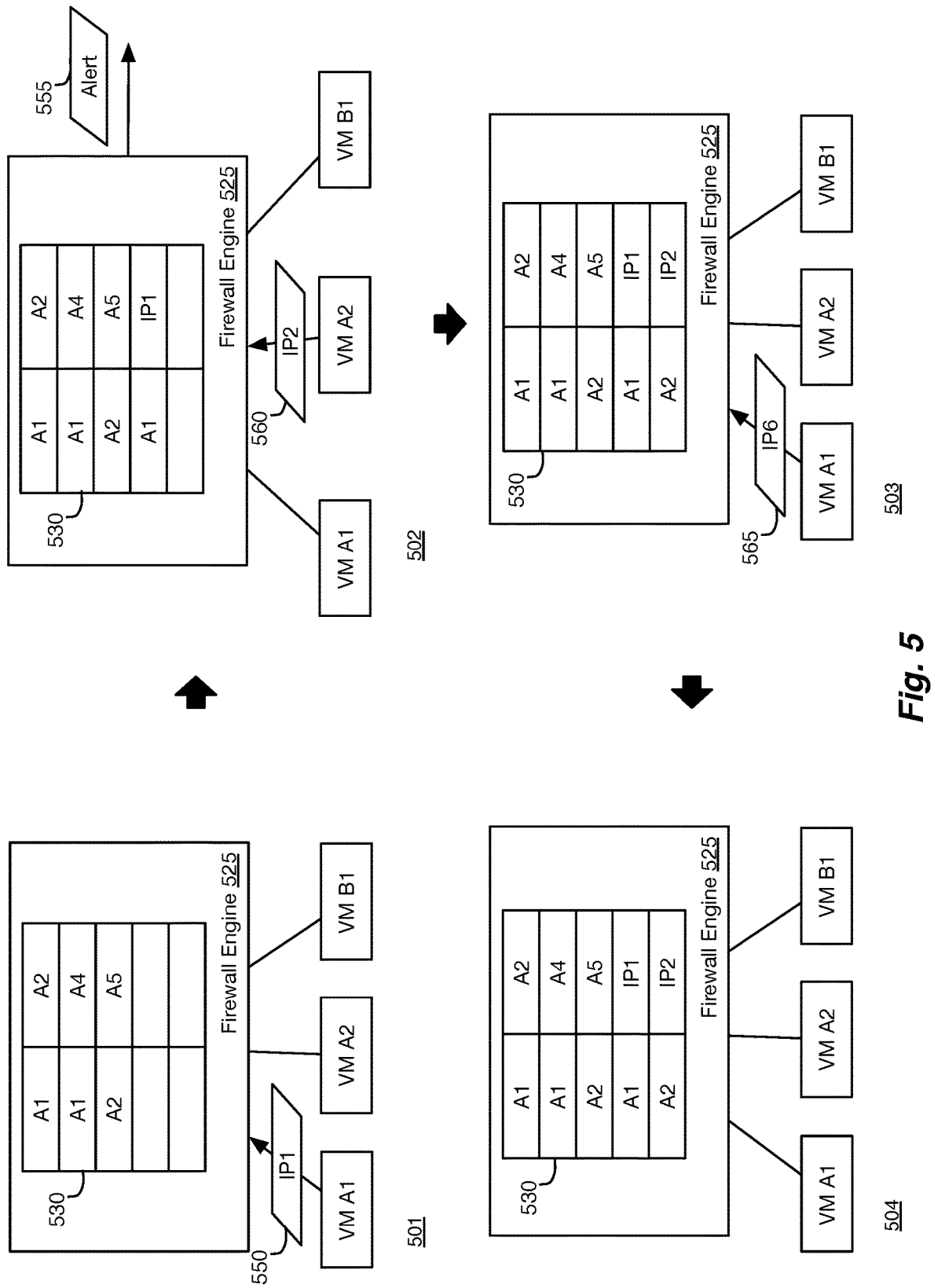
FIG. 5 illustrates an example of resource usage by a service operating on a host machine.

FIG. 5 illustrates an example of resource usage by a distributed service operating on a host machine in four stages 501-504. The first stage 501 shows that VM A1 for tenant A sends a packet 550 to a destination Internet protocol (IP) address IP1. The packet 550 is intercepted by the firewall engine 525 (e.g., through filters of a software switch (not shown)). Firewall engine 525 maintains a connection table 530 to store state information for various connections made by the different VM machines. In this example, connection table 530 stores connections for tenant A in the connection table and represents the amount of memory (or other resources) available for the firewall engine 525 of tenant.

In the second stage 502, the state information for the connection between VM A1 and the machine at IP1 is stored in the connection table 530. In this example, as the available resources of the connection table 530 are approaching a limit (e.g., when the available resources are almost depleted (e.g., 90% full)), an alert 555 is triggered. The alert of some embodiments is sent to alert a user (e.g., administrators of the datacenter and/or tenant) regarding potential network service outages. Various methods for alerting are described in further detail below in section III.B. The second stage 502 also shows that VM A2 sends another packet 560 that is intercepted by firewall engine 525.

As an enhancement, the service manager of some embodiments configures automatic actions that can be taken at varying threshold values (e.g., in response to different alerts) for the service resources. For instance, there can be multiple increasing threshold levels with corresponding yellow, orange and red alerts. When the system hits the yellow alert, only a notification could be generated. When it gets to orange, an email could be generated to the admin. When it gets to red, corrective actions (e.g., shutting down the errant VM, dropping all new/existing connections from the errant VM, etc.) could be taken, either automatically (i.e., upon detection of the red alert) or upon instructions from an administrator.

The third stage 503 shows that the state information for packet 560 (i.e., between VM A2 and the machine at IP2) has been added to the connection table 520. In some embodiments, another alert is sent when the resources are full. In some embodiments, different levels of alerts are provided for managing the distributed services in a network.

The third stage 503 also shows that VM A1 wants to establish another connection with a new machine at IP6. However, as shown in the fourth stage 504, because the connection table 530 is full (i.e., the available host resources for the firewall engine 525 are all consumed), the connection request 565 is dropped. In some embodiments, all new connection requests are dropped until more resources become available for firewall engine 525 (e.g., based on new resource allocations, releasing old network connections, etc.).

III. Monitoring Host Service Usage

As resources are spread out over many host machines in a network system (e.g., datacenters, cloud environments, etc.), it becomes increasingly difficult to monitor the aggregate resources used by the various entities (e.g., tenants, partner service providers, etc.). Some embodiments provide methods for calculating service usage and presenting the aggregated service usage data to a user (e.g., an administrator for a tenant/datacenter/service, etc.).

A. Calculating Service Usage

Some embodiments provide methods to calculate metrics to measure the usage of different host resources by services operating on the host machines. Usage metrics can be useful in capacity planning and server consolidation ratio while using distributed services in a network system. For example, in some embodiments, the usage metrics are monitored for a test implementation (e.g., on an emulated network deployment, on a subset of machines in the deployment, etc.), prior to the full deployment of machines and services in a datacenter. Based on the calculated metrics for host machine resource usage in the test implementation, an administrator can extrapolate to determine an optimal allocation of workload and service resources for host machines in a full deployment of machines in the network.

In addition, calculating such metrics can be used to identify attack scenarios by malicious attackers within the datacenter. For example, when the calculated metrics determine that a particular VM is suddenly consuming more resources than usual, the services engine of some embodiments generates appropriate notifications to the administrators. The sections below describe algorithms used to calculate resource usage (e.g., memory and processor resources) by services in a network.

1. Memory Utilization

In order to monitor memory utilization by services operating at the host machines, some embodiments provide a monitoring module that operates on each host machine. The monitoring module of some embodiments is used to manage heap memory allocations/deallocations at the host machine. In some embodiments, the monitoring module monitors memory usage by tracking the consumed memory and the total available memory for each memory allocation/deallocation. For every memory allocation from any of the memory heaps, the monitoring module increments the consumed memory and decrements the total available memory by that amount. For every free memory call from any of the memory heaps, the monitoring module increments the total available memory and decrements the consumed memory by that amount.

In some embodiments, when the total available memory (i.e., the total memory available for a particular service, VNIC, tenant, etc.) sinks below a particular threshold (or when the consumed memory exceeds a threshold), the monitoring module sends an alert to the services manager. In other embodiments, the monitoring module sends all of the calculated and monitored data to the services manager, and the services manager calculates the metrics to determine whether to generate new alerts based on the consumed resources. Generation of the alerts is discussed in further detail below.

2. CPU Utilization

The monitoring module of some embodiments is used to monitor processor usage at the host machine for the services. The processing resources can be consumed for various functions of the services, such as processing packets, flow management, reporting, analyzing files, as well as creating and purging connection states. In some embodiments, the time spent performing the service functions are calculated using a timer, which tracks the time used for each function path. The time used is then tracked for each entity (e.g., tenant, service, VNIC, etc.).

In some embodiments, the metric measures the amount of the processing resources utilized by each entity. In some embodiments, the monitoring module periodically polls the CPU usage and calculates utilized processing resources as:

$$CPU\_utilized = \frac{totalCurrentCpuTime - totalPreviousCpuTime}{time\ at\ polling - prevPollTime} * (numCPUs\ used)$$

3. Connections Per Second (CPS)

In some embodiments, rather than directly calculating the resources consumed by the services, the monitoring module calculates a number of connections per second (CPS) that are handled by a service (e.g., a firewall). CPS is a metric that is commonly used by hardware vendors for firewalls to monetize the firewall services and to provide different grades of service for different clients.

However, as the services are distributed through the system, rather than at an edge of the network, CPS becomes difficult to calculate in a distributed system. The calculated CPS for a distributed service can be calculated by a monitoring module operating on the host itself and presented to an administrator, either as a combined (or aggregate) level value or independently at the host level.

In some embodiments, the monitoring module schedules a thread to collect all the new flows (new connections) across all of the filters of the host machine for a constant time interval. The monitoring module of some embodiments tracks the count of new flows for each filter and sums it up to determine the total number of new flows for the time period. The monitoring module divides the number of new connections over the time interval to calculate the CPS handled by the service.

In some embodiments, these metrics are measured at various intervals (e.g., every 10 seconds) to allow administrators monitor resource usage by the services. The algorithms of some embodiments are performed periodically in a separate thread to measure these metrics. In some embodiments, the intervals at which the metrics are captures are configured by the administrator as well.

In addition to calculating them periodically, the services manager of some embodiments triggers (e.g., through a UI and/or API calls) an on-demand calculation of these metrics at the monitoring modules of the host machines. The on-demand calculation of these metrics allows an administrator of the network to proactively monitor resource usage by the services of the network. In some embodiments, the metrics are continuously calculated, using a separate thread that continuously monitors the usage of the various metrics and presents this data to a user (e.g., in the services manager UI), allowing the administrator to identify and resolve issues in real-time.

B. Presenting Distributed Service Usage

The services manager of some embodiments calculates the various metrics and presents them to an administrator, allowing the administrator to monitor performance and resolve potential issues in the network. In some embodiments, the service usage is presented at multiple levels of aggregation. The services manager of some embodiments aggregates the measured performance metrics (like those described above) from the distributed services at the host machines and presents the combined metrics for an administrator services manager layer.

Figure 6:
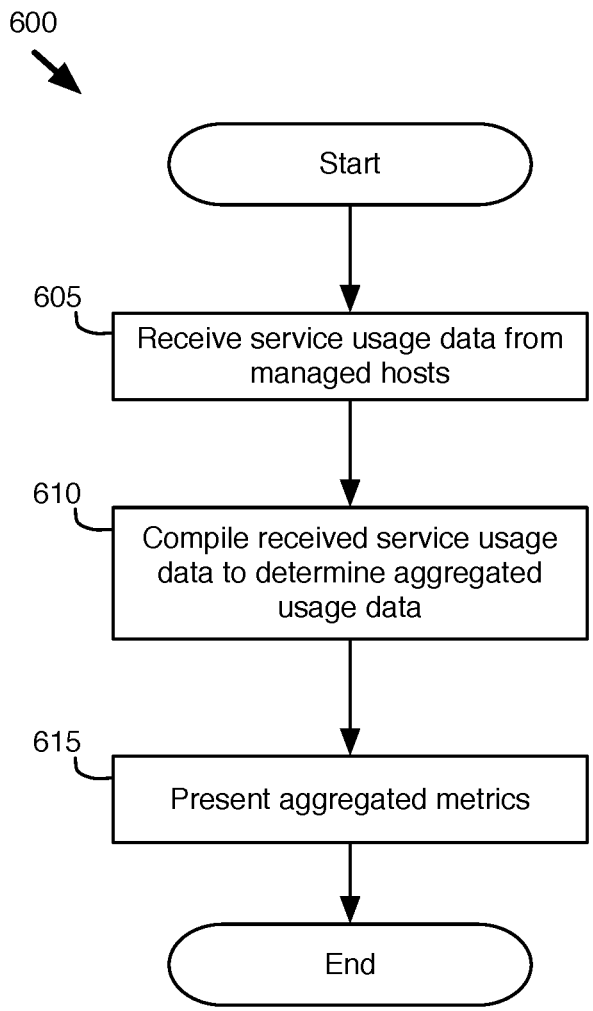
FIG. 6 conceptually illustrates a process for gathering and presenting aggregated service usage data.
Figure 7:
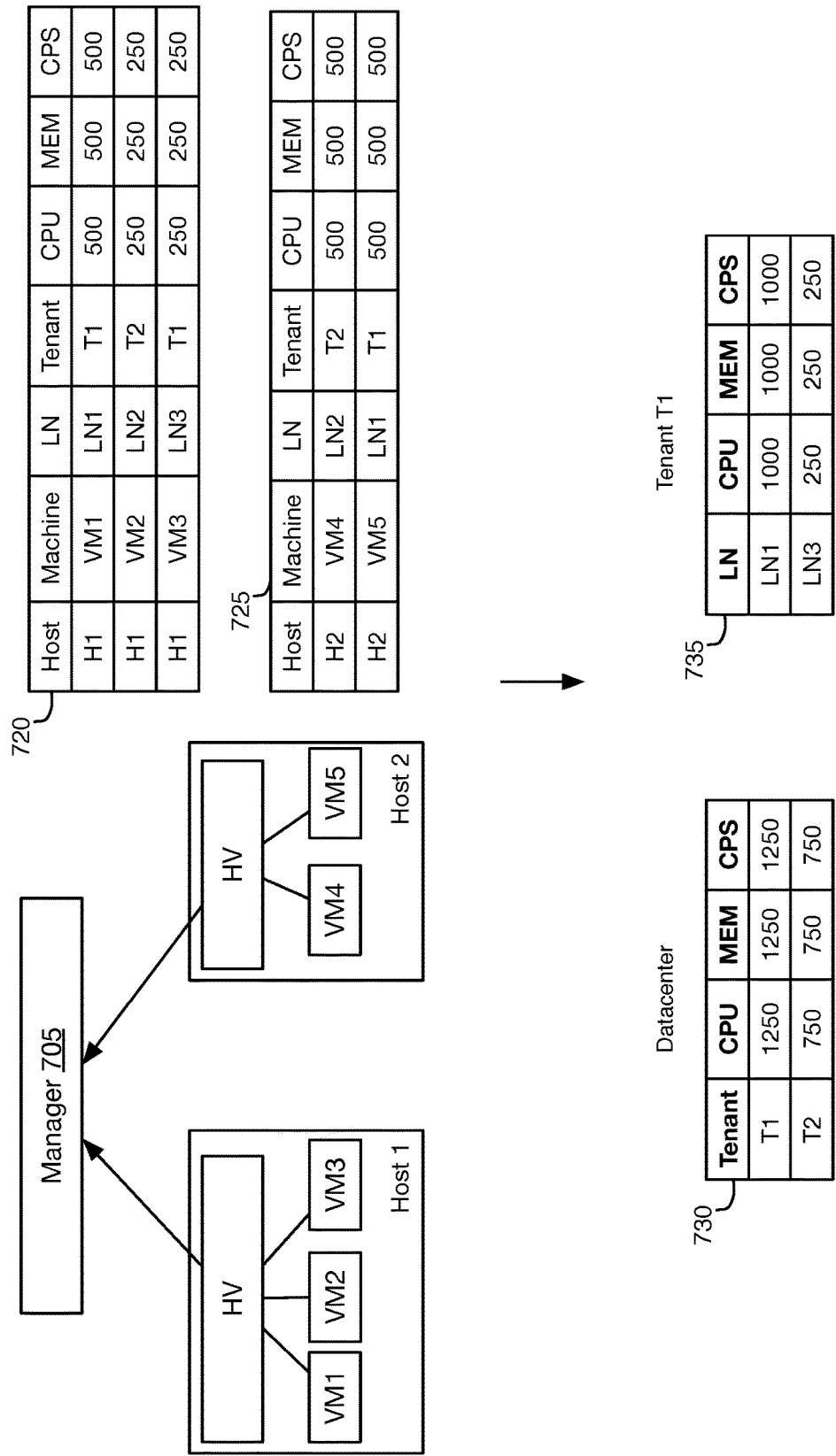
FIG. 7 illustrates an example of gathering and presenting aggregated service usage data.

FIG. 6 conceptually illustrates a process for gathering and presenting aggregated service usage data. The process 600 is described with reference to the example of FIG. 7. FIG. 7 illustrates an example of gathering and presenting aggregated service usage data. The example of this figure shows service data as it is collected and analyzed in a network. Specifically, this example shows a manager 705 that collects service usage data from hosts 1 and 2.

The process 600 receives (at 605) service usage data from the managed host machines. The managed host machines of some embodiments are host machines of a network (e.g., a datacenter, etc.) that operate VMs for multiple clients. The example of FIG. 7 shows data 720 and 725, which are collected at each of the host machines 1 and 2 respectively. The service usage data of some embodiments includes various metrics for measuring the usage of host service resources (e.g., processor usage (CPU), memory usage (MEM), connections per second (CPS), etc.).

The process 600 then compiles (at 610) the received service usage data for multiple hosts managed by a particular services manager to present overall metrics at the manager level. For example, in some embodiments, the process 600 provides a set of aggregate views of the collected service usage data divided by tenant, so that a system administrator can easily view the service resource usage of each tenant in the system. Similarly, the usage data can also be divided based on the different services, service providers, or even host machines. Displaying the gathered metrics at a per-host level (how much CPU, memory, CPS on each host), allows an administrator to identify potential issues at a particular host based on service usage.

The process 600 then presents (at 615) the aggregated metrics to a user (e.g., an administrator) of the system. In some embodiments, different metrics are provided to different administrators based on their roles in the network. For example, an administrator for tenant A may view usage metrics for the machines of tenant A, while an administrator for a datacenter may view usage metrics for several tenants throughout the datacenter. Alternatively, or conjunctively, the per host metrics will be aggregated in the services manager to present the metrics from the network service level (e.g., CPS of the distributed firewall, combined CPU usage of all SVMs of a third party vendor, combined memory usage of a service engine across multiple hosts, etc.).

In some embodiments, the services manager presents alerts to the user based on threshold values that are determined for the different metrics. In some embodiments, an administrator can configure resource thresholds for the different metrics (e.g., CPS, CPU/memory utilization, etc.) through the services manager. The services manager of some embodiments then updates the monitoring modules at the host machines to trigger alerts based on the thresholds. In some embodiments, the threshold configuration is performed via a REST API (for Cloud Management Platforms) or a UI of the services manager.

For example, when the tenant starts to hit the limits on the configured resource pool (e.g., when the connection heap is filled with connections for the workload VMs of the tenant), an alert (or a series of alerts) is generated to the provider admin to review. Based on the total available resource pool and/or a service level agreement for the tenant, the provider can choose to allocate more resources from the available resource pool. If not, any new connections will be dropped. In some embodiments, the filters (which capture network traffic before sending them to a destination and/or to a service) are updated based memory consumption and are used to determine whether to initiate a new connection request.

Figure 8:
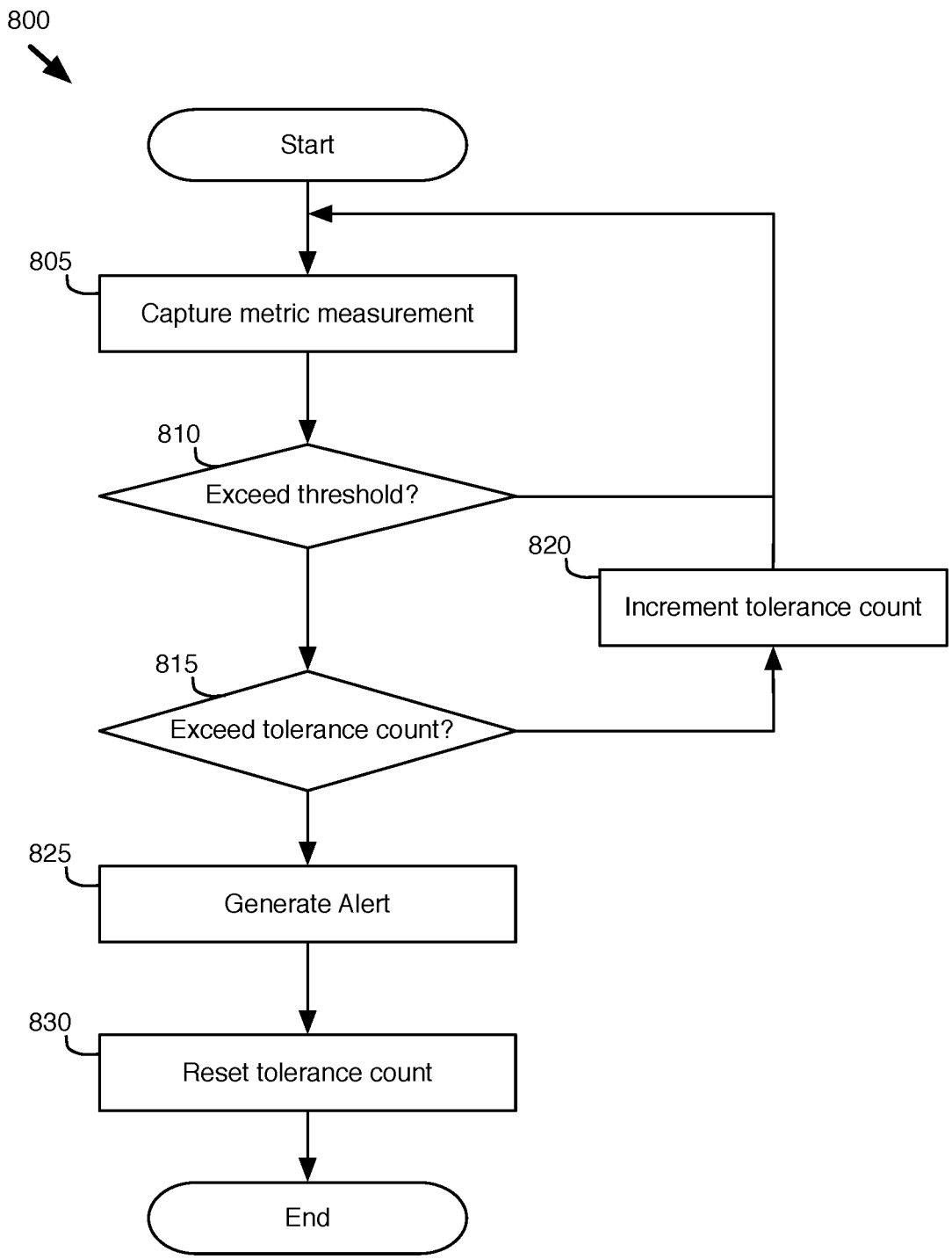
FIG. 8 conceptually illustrates a process for generating alerts for service usage.

FIG. 8 conceptually illustrates a process for generating alerts for service resource usage. The process 800 of some embodiments is performed by a distributed service engine operating at a host machine, as described above. The process 800 captures (at 805) a metric measurement. The metric measurements include various measures of resource usage at the host machine.

The process 800 then determines (at 810) whether the resource usage metric exceeds a particular threshold. The threshold of some embodiments is determined by an administrator or automatically by a services manager based on an amount (or percentage) of available resources.

In some embodiments, the metric measurements are captured (at 805) during a testing phase of a deployment to measure the service resource usage by workload VMs in a test system (e.g., emulated workloads, a testing subset of the full system, etc.). The captured metric measurements are then used to configure the thresholds at which the alerts are triggered in the actual deployment.

When the process 800 determines (at 810) that the captured metric does not exceed the determined threshold, the process 800 continues to monitor the system and returns to step 805. When the process 800 determines (at 810) that the captured metric does exceed the determined threshold, the process 800 determines (at 815) whether a tolerance count has been exceeded. When the tolerance count has not been exceeded, the process 800 increments (at 820) the tolerance count and continues to monitor the system by returning to step 805.

When the tolerance count has been exceeded, the process 800 generates (at 825) an alert for the captured metric measurement for a user (e.g., a datacenter/tenant administrator). The alerts of some embodiments are sent to the user through various means (e.g., email, UI alerts, text message, etc.). In some embodiments, the alerts simply inform the user of a potential issue, while in other embodiments, the alerts are provided along with options to deal with the potential issue (e.g., option to purchase more security resources, to add new hosts, etc.).

In some embodiments, alerts are not sent each time the threshold is exceeded. Rather, a tolerance count is used to determine whether the threshold count has been exceeded a particular number of times before sending out an alert. In some embodiments, the process only sends an alert if the threshold is exceeded the particular number (e.g., 3) of times within a particular time interval (e.g., 10 minutes). In some embodiments, the tolerance count is 0, and the process 800 generates (at 825) an alert each time the captured metric exceeds the determined threshold. The threshold count allows system to handle periodic spikes in activity without unnecessarily generating an excessive number of alerts.

Once an alert has been generated (at 825), the process 800 of some embodiments resets (at 830) the tolerance count and the process 800 ends. Although this example describes providing a single alert for a single metric measurement, the process 800 can be used to provide various different levels of alerts with various threshold levels and tolerance counts.

In some embodiments, in addition to providing the alerts to a user, various corrective actions are taken (e.g., by the services manager and/or monitoring modules) based on the alerts. For example, in some embodiments, when a critical alert is detected, the services manager of some embodiments shuts down a problem VM, or moves VMs from a problem host to a new host machine. In some embodiments, the service manager will perform various actions to increase the available resources, such as adding new hosts, re-allocating the service resources at various hosts, consolidating VMs for different tenants on separate machines, etc. The actions of some embodiments are performed automatically (e.g., upon detection of the critical alert) or manually (e.g., upon receiving additional instructions from an administrator). In other embodiments, the services manager will continue to provide the services, but any new connections or attempts to use the service will fail, until the resources become available again.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
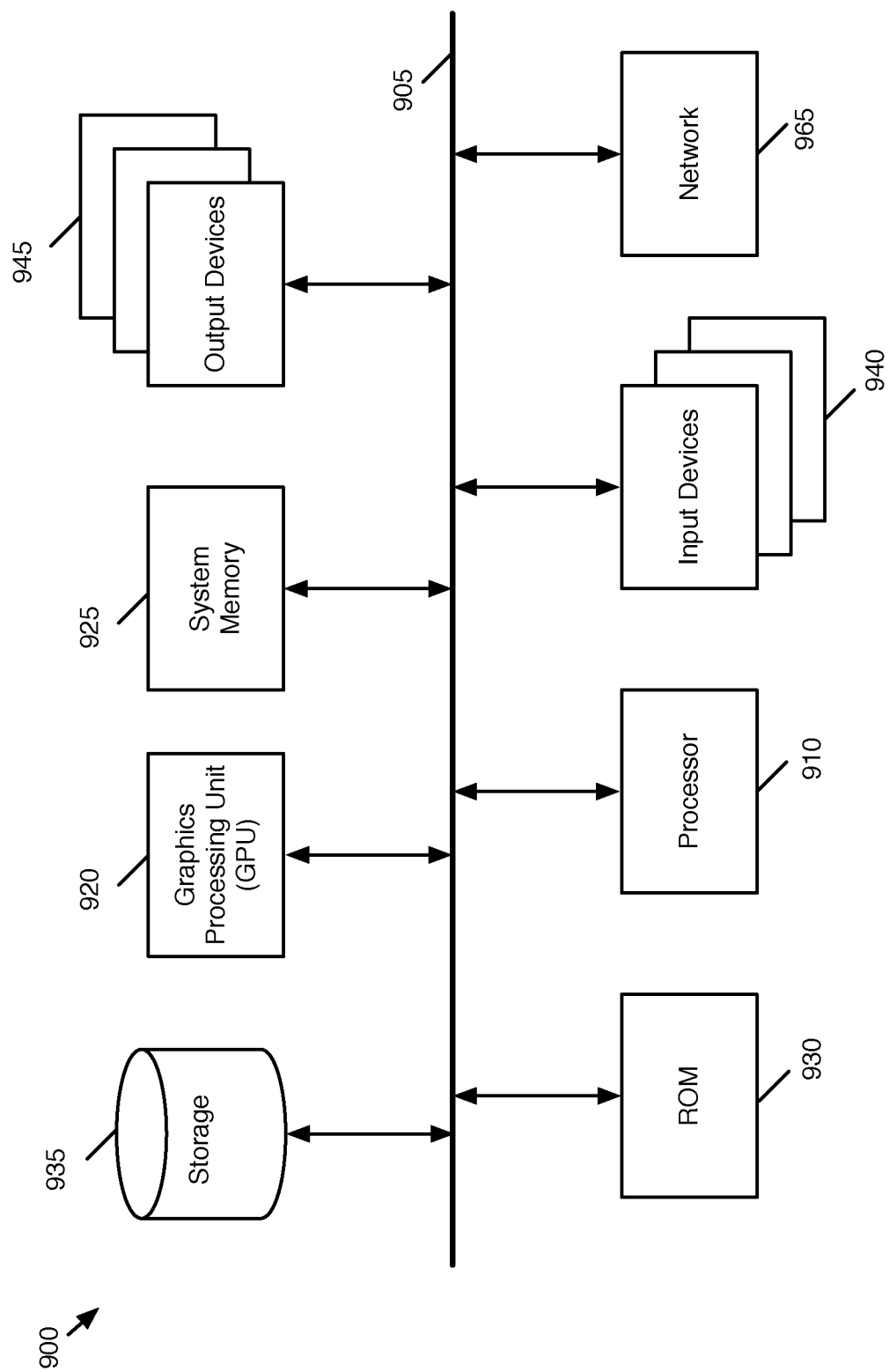
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieves instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash memory device, etc., and its corresponding drive) as the permanent storage device. Like the permanent storage device 935, the system memory 925 is a read-and-write memory device. However, unlike storage device 935, the system memory 925 is a volatile read-and-write memory, such a random access memory. The system memory 925 stores some of the instructions and data that the processor needs at runtime. In some embodiments, the invention's processes are stored in the system memory 925, the permanent storage device 935, and/or the read-only memory 930. From these various memory units, the processing unit(s) 910 retrieves instructions to execute and data to process in order to execute the processes of some embodiments.

The bus 905 also connects to the input and output devices 940 and 945. The input devices 940 enable the user to communicate information and select commands to the electronic system. The input devices 940 include alphanumeric keyboards and pointing devices (also called "cursor control devices"), cameras (e.g., webcams), microphones or similar devices for receiving voice commands, etc. The output devices 945 display images generated by the electronic system or otherwise output data. The output devices 945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

The term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for allocating resources on host computers executing workload data compute nodes (DCNs) and sets of service machines performing at least one service for the DCNs, the method comprising:
    from each of a group of host computers, receiving service usage data regarding at least one resource consumed by at least one service machine executing on the host computer that performs a service for data messages sent to or from at least one DCN executing on the host computer;
    analyzing the received service usage data to identify a set of new resource allocations for a set of service machines executing on a set of host computers; and
    to each host computer in the set of host computers, providing a resource allocation instruction that relates to at least one identified new resource allocation and that directs the host computer to modify an amount of one resource allocated to one service machine executing on the host computer to perform the service on data messages sent to or from one workload DCN executing on the host computer.

2. The method of claim 1, wherein the service usage data comprises at least one of a number of computations made per second, a connections per second (CPS) measurement, and an amount of memory used.

3. The method of claim 1, wherein the group of host computers comprises the set of host computers.

4. The method of claim 1, wherein the group of host computers is a test implementation of a full deployment and the full deployment comprises the set of host computers.

5. The method of claim 1 further comprising:
    displaying the identified set of new resource allocations to an administrator; and
    receiving, from an administrator, instructions to provide the identified set of new resource allocations to the set of host computers,
    wherein providing the identified new resource allocation instruction to each host computer in the set of host computers is based on the received instructions.

6. The method of claim 1 further comprising:
    aggregating the received service usage data;
    generating at least one alert based on the aggregated data; and
    displaying the at least one alert in a user interface.

7. For a host computer, a method for monitoring a middlebox service machine executing on the host computer to provide a middlebox service operation for a set of workload data compute nodes (DCNs) executing on the host computer, the method comprising:
    monitoring a service usage metric that measures an amount of resources consumed by the middlebox service machine while performing the middlebox service operation on data messages sent to or from the set of workload DCNs; and
    based on the service usage metric exceeding a particular threshold value a particular number of times, generating an alert to notify a user of an unavailability of resources for performing the middlebox service operations on the data messages sent to or from the set of workload DCNs, said particular number being greater than one.

8. The method of claim 7, wherein monitoring the service usage metric comprises periodically calculating the service usage metric.

9. The method of claim 7, wherein the service usage metric comprises at least one of processor usage, a connections per second (CPS) measurement, and memory usage.

10. The method of claim 7, wherein the alert is generated only if the service usage metric exceeds the particular threshold value the particular number of times within a particular time interval.

11. The method of claim 7, wherein the particular number is a first number and the alert is a first alert, wherein the method further comprises, when the service usage metric exceeds the particular threshold value a second number of times that is greater than the first number, generating a second alert that is different than the first alert.

12. The method of claim 11, wherein the method further comprises automatically performing a corrective action when the service usage metric exceeds the particular threshold value the second number of times.

13. The method of claim 12, wherein the corrective action comprises at least one of shutting down a DCN and moving a DCN to a different host computer.

14. The method of claim 7, wherein the particular threshold value is specified by an administrator for the plurality of DCNs.

15. The method of claim 7, wherein the particular threshold value is specified as a percentage of the available resources for performing the service.

16. The method of claim 7, wherein the monitoring is performed during a testing phase, wherein an administrator sets the particular threshold value for a deployment phase based on the service usage metric monitored during the testing phase.

17. A non-transitory machine readable medium storing a program which when executed by a set of processing units allocates resources on host computers executing workload data compute nodes (DCNs) and sets of service machines performing at least one service for the DCNs, the program comprising sets of instructions for:
    from each of a group of host computers, receiving service usage data regarding at least one resource consumed by at least one service machine executing on the host computer that performs a service for data messages sent to or from at least one DCN executing on the host computer;
    analyzing the received service usage data to identify a set of new resource allocations for a set of service machines executing on a set of host computers; and
    to each host computer in the set of host computers, providing a resource allocation instruction that relates to at least one identified new resource allocation and that directs the host computer to modify an amount of one resource allocated to one service machine executing on the host computer to perform the service on data messages sent to or from one workload DCN executing on the host computer.

18. The non-transitory machine readable medium of claim 17, wherein the program further comprises sets of instructions for:

aggregating the received service usage data;
generating at least one alert based on the aggregated data; and
displaying the at least one alert in a user interface.

19. The non-transitory machine readable medium of claim 17, wherein the group of host computers comprises a group of one or more host computers.

20. A method for allocating resources on host computers executing workload data compute nodes (DCNs) and sets of service machines performing at least one service for the DCNs, the method comprising:
   from each of a group of host computers, receiving service usage data regarding at least one resource consumed by at least one service machine executing on the host computer that performs a service for data messages sent to or from at least one DCN executing on the host computer;
   analyzing the received service usage data to identify a set of new resource allocations for a set of workload DCNs executing on a set of host computers; and
   to each host computer in the set of host computers, providing a resource allocation instruction that relates to at least one identified new resource allocation and that directs the host computer to modify an amount of at least one resource allocated to a group of one or more workload DCNs executing on the host computer.

21. The method of claim 20, wherein a particular resource allocation instruction directs a particular host computer in the set of host computers to modify the amount of a resource allocated to the group of one or more workload DCNs to accommodate at least one additional workload DCN in the group of one or more workload DCNs executing on the particular host computer.

22. The method of claim 20, wherein a particular resource allocation instruction directs a particular host computer in the set of host computers to reduce the amount of a resource allocated to the group of one or more workload DCNs based on the removal of at least one workload DCN from the group of one or more workload DCNs executing on the particular host computer.

* * * * *